(12) United States Patent
Hartlieb et al.

(10) Patent No.: US 8,996,931 B2
(45) Date of Patent: Mar. 31, 2015

(54) SYSTEM AND METHOD TO TRANSMIT DATA, IN PARTICULAR ERROR DATA OVER A BUS SYSTEM

(75) Inventors: Heimo Hartlieb, Graz (AT); Michael Hausmann, Gleisdorf (AT)

(73) Assignee: Infineon Technologies AG, Neubiberg (DE)

( * ) Notice: Subject to any disclaimer, the term of this patent is extended or adjusted under 35 U.S.C. 154(b) by 294 days.

(21) Appl. No.: 13/427,280

(22) Filed: Mar. 22, 2012

(65) Prior Publication Data

US 2013/0254600 A1 Sep. 26, 2013

(51) Int. Cl.
*G06F 11/00* (2006.01)
*G06F 11/07* (2006.01)
*H04L 12/40* (2006.01)

(52) U.S. Cl.
CPC ........ *G06F 11/0724* (2013.01); *G06F 11/0775* (2013.01); *H04L 12/40013* (2013.01)
USPC .................................. 714/57; 714/25; 714/45

(58) Field of Classification Search
CPC ......... G06F 11/27; G06F 13/00; G06F 13/40; G06F 13/42
USPC ................................................. 714/57, 25, 48
See application file for complete search history.

(56) References Cited

U.S. PATENT DOCUMENTS

| 8,108,647 B2 * | 1/2012 | Bartley et al. ................. 711/170 |
| 2003/0154426 A1 * | 8/2003 | Chow et al. ..................... 714/30 |
| 2004/0153888 A1 * | 8/2004 | Kadoi .............................. 714/57 |
| 2008/0052417 A1 * | 2/2008 | Aoyama et al. ................... 710/1 |
| 2010/0083049 A1 * | 4/2010 | Miki ............................... 714/38 |
| 2011/0126055 A1 * | 5/2011 | Shimada et al. ................ 714/37 |

* cited by examiner

*Primary Examiner* — Sarai Butler
(74) *Attorney, Agent, or Firm* — Slater & Matsil, L.L.P.

(57) ABSTRACT

The invention relates to an electrical or electronic system, and more specifically, to a system with a bus, and a method to transmit data, in particular error data over a bus system. According to an embodiment, a method to transmit error data over a bus system that connects a plurality of modules/components/elements of an electronic system in a chain-like structure comprises in a first phase, transmitting information regarding what kinds of errors have occurred in the system, and in a second phase, transmitting information regarding where in the system an error has occurred.

21 Claims, 4 Drawing Sheets

|   | Open Load | Short-circuit | Charge balancing | Temperature |
|---|---|---|---|---|
| 0 |   |   |   |   |
| 1 |   |   |   |   |
| 2 |   | X |   |   |
| 3 |   |   |   |   |
| 4 | X |   |   |   |

Fig. 4

SYSTEM AND METHOD TO TRANSMIT DATA, IN PARTICULAR ERROR DATA OVER A BUS SYSTEM

TECHNICAL FIELD

The invention generally relates to an electrical or electronic system, and in specific embodiments, to a system comprising a bus, and a method to transmit data, e.g., error data over a bus system.

BACKGROUND

In electrical or electronic systems, various individual system modules, for instance various electronic/electric assemblies, various electronic/electric components, for instance various semi-conductor components such as integrated circuits, etc., various sub-components, provided in one and the same component or integrated circuit etc., communicate via a transfer medium such as a bus system.

A bus system may comprise one or more transfer lines. Bus systems can be used jointly by several, in particular by two or more than two modules/components/elements of a respective system.

Many conventional bus systems comprise several partial systems, for example, a data bus, consisting of one or more data lines, and/or an address bus consisting of one or more address lines, and/or a control bus consisting of one or more control lines, etc.

In comparison to this, other bus systems are of a much simpler construction. For example, a so-called IBCB bus (IBCB=Inter Block Communication Bus) in general merely comprises two transmission lines to connect two respective modules/components/elements.

Further examples for relatively simple bus systems are CAN busses (CAN=Controller Area Network), which generally only comprise two or three lines (e.g., CAN_HIGH, CAN_LOW, and optionally, CAN_GND (ground)), LIN busses (LIN=Local Interconnect Network), which generally comprise only one single transmission line, etc.

In many conventional systems, for instance, in systems with an IBCB bus, various modules/components/elements may be connected in a chain-like structure. For instance, a first component may be connected via two IBCB transmission lines to a second component, the second component may be connected via two IBCB transmission lines to a third component, the third component may be connected via two IBCB transmission lines to a fourth component, etc. Hence, e.g., a logical "1" (or correspondingly, a logical "0") may first be transmitted from the first component to the second component in the above chain of components, then from the second component to the third component, then from the third component to the fourth component, etc.

In addition, a central microprocessor or microcontroller may be provided, which, e.g., may be connected with the first (or last) component in the above chain of components, e.g., via SPI (SPI=Serial Peripheral Interface), or any other suitable connection.

However, in case of an error, respective error data must be transmitted to the above microprocessor or microcontroller, and/or, e.g., a main control device.

For this purpose, in conventional systems, separate transmission lines may be provided that directly connect a respective component with the above central microprocessor or microcontroller and/or the above main control device. In this case, however, additional cables have to be provided.

For these or other reasons there is a need for improved systems and methods to transmit data, in particular error data over a bus system.

BRIEF DESCRIPTION OF THE DRAWINGS

The accompanying drawings are included to provide a further understanding of the present invention and are incorporated in and constitute a part of this specification. The drawings illustrate embodiments of the present invention and together with the description serve to explain the principles of the invention. Other embodiments of the present invention and many of the intended advantages of the present invention will be readily appreciated, as they become better understood by reference to the following detailed description.

DETAILED DESCRIPTION OF ILLUSTRATIVE EMBODIMENTS

In the following detailed description, reference is made to the accompanying drawings, which form a part hereof, and in which is shown by way of illustration specific embodiments in which the invention may be practiced. It is to be understood that other embodiments may be utilized and structural or other changes may be made without departing from the scope of the present invention. The following detailed description, therefore, is not to be taken in a limiting sense, and the scope of the present invention is defined by the appended claims.

Figure 1:
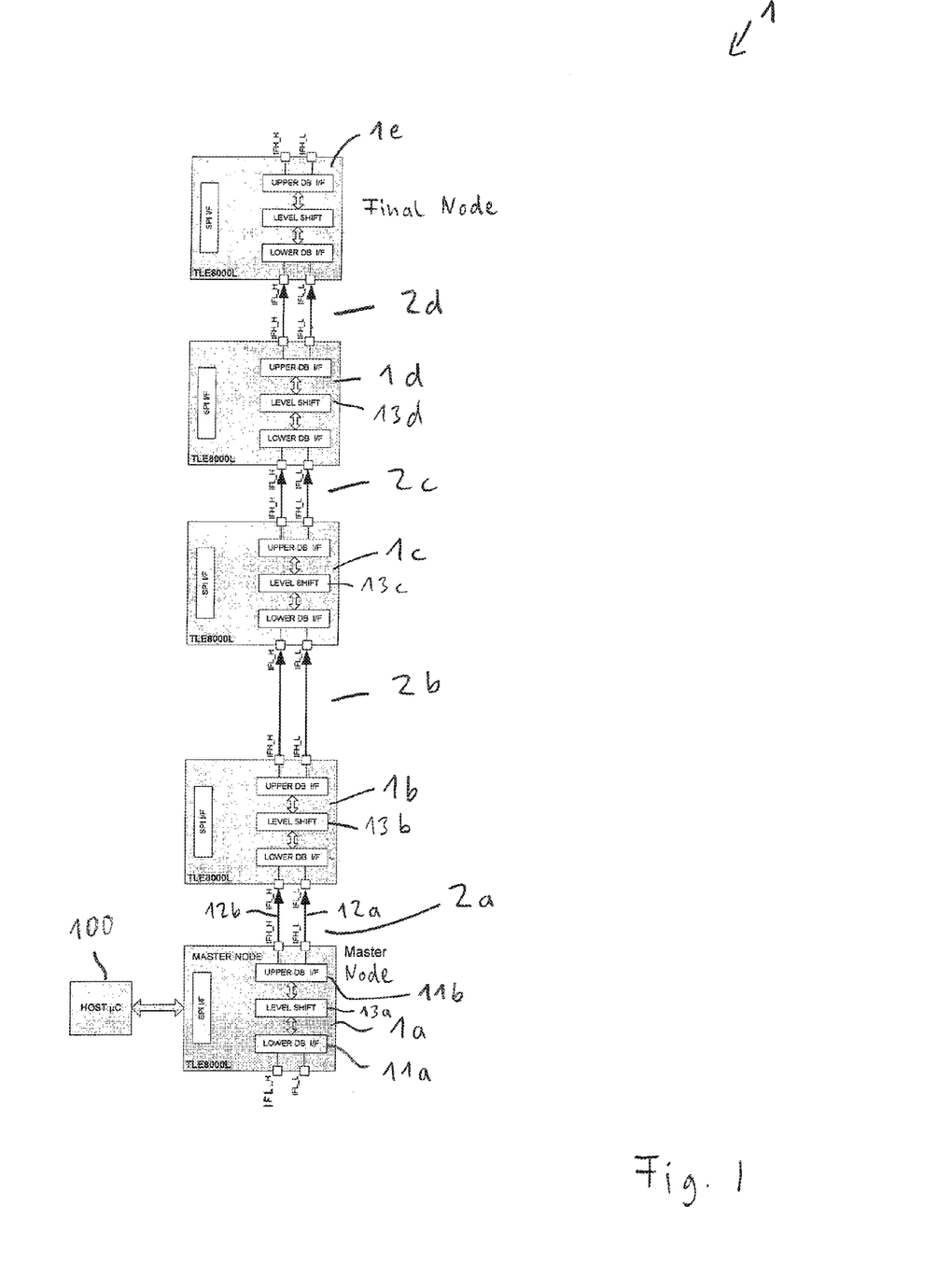
FIG. 1 depicts a schematic structure of an exemplifying electronic/electric system comprising a bus in which a method to transmit data, in particular error data according to an embodiment of the invention may be employed.

FIG. 1 shows a schematic representation of an exemplifying electronic/electric system 1 comprising a bus in which a method to transmit data, in particular, error data according to an embodiment of the invention may be employed.

As shown in FIG. 1, the system 1 comprises a plurality of modules/components/elements 1a, 1b, 1c, 1d which are connected in a chain-like structure over various busses 2a, 2b, 2c, 2d.

The components 1a, 1b, 1c, 1d may, e.g., be or comprise semi-conductor components such as integrated circuits 1a, 1b, 1c, 1d, for instance, respective ASICS (ASIC=application specific integrated circuit), microprocessors, microcontrollers, etc., or any other kind of integrated circuit or component comprising an integrated circuit. In particular, the components may be or comprise respective BALI ASICS (BALI=Battery Management for Lithium Ion Cells) 1a, 1b, 1c, 1d, etc.

Alternatively, the system 1 may be, e.g., a single integrated circuit chip, comprising various sub-components 1a, 1b, 1c, 1d, provided in one and the same single integrated circuit chip 1, the various sub-components/elements 1a, 1b, 1c, 1d of the single integrated circuit chip 1 being connected in a chain-like structure over various chip-internal busses 2a, 2b, 2c, 2d.

Preferably, the system 1 comprises a relatively high number of modules/components/elements 1a, 1b, 1c, 1d, e.g., more than two, in particular, more than five or ten or twenty modules/components/elements 1a, 1b, 1c, 1d, e.g., more than five or ten or twenty separate integrated circuits (or sub-components of a single integrated circuit), connected in the above chain-like structure over the above busses 2a, 2b, 2c, 2d.

Each of the busses 2a, 2b, 2c, 2d, e.g., may comprise as shown in FIG. 1, two respective transmission lines 12a, 12b, over which data may, e.g., be transmitted in differential form. Alternatively, each bus may, e.g., only comprise one single transmission line, or more than two, e.g., three or more than three transmission lines.

For example, the busses 2a, 2b, 2c, 2d may be respective IBCB busses (IBCB=Inter Block Communication Bus), or any other kind of busses (e.g., respective CAN busses (CAN=Controller Area Network), LIN busses (LIN=Local Interconnect Network), or similar busses, etc.).

The above system 1, e.g., may be used in a vehicle, e.g., a car, a plane, a helicopter, a motorcycle, etc., in particular, in a car comprising an electric engine (and/or a combustion engine).

For instance, the system 1 may be used to control a battery, e.g., a battery provided in an electric vehicle, or any other battery provided, e.g., in any of the above-mentioned vehicles.

In the battery, several cells, e.g., respective Lithium Ion Cells, or any other kind of cells may be connected in series. The series connection of the cells may result in the battery providing a total voltage of more than ten, preferably more than hundred, two-hundred or five-hundred volts.

Each of the above modules/components/elements 1a, 1b, 1c, 1d of the system 1, e.g., each of the above integrated circuits/ASICS 1a, 1b, 1c, 1d may be used to monitor and/or control different ones of the above cells, and/or different blocks of cells/battery modules, each block of cells/battery module comprising several, different ones of the cells.

For instance, a first integrated circuit/ASIC 1a of the above integrated circuits 1a, 1b, 1c, 1d may be used to monitor and/or control a first cell, and/or a first battery module. A second integrated circuit/ASIC 1b of the above integrated circuits 1a, 1b, 1c, 1d may be used to monitor and/or control a second cell, and/or a second battery module. A third integrated circuit/ASIC 1c of the above integrated circuits 1a, 1b, 1c, 1d may be used to monitor and/or control a third cell, and/or a third battery module. A fourth integrated circuit/ASIC 1d of the above integrated circuits 1a, 1b, 1c, 1d may be used to monitor and/or control a fourth cell, and/or a fourth battery module, etc.

Thereby, e.g., the electric charge loaded in the respective cells/block of cells associated with a respective integrated circuit 1a, 1b, 1c, 1d may be detected by a respective integrated circuit 1a, 1b, 1c, 1d. Alternatively or in addition thereto, with the help of a respective integrated circuit 1a, 1b, 1c, 1d, an appropriate reaction to a detected electric charge loaded in respective cells/blocks of cells may be controlled. For instance, by use of a respective integrated circuit 1a, 1b, 1c, 1d, a single associated cell, and/or an associated block of cells may be discharged (passive balancing). Further, by use of a respective integrated circuit 1a, 1b, 1c, 1d, charge may be transferred between single cells, and/or respective blocks of cells (active balancing).

The above busses 2a, 2b, 2c, 2d, e.g., may be used to transmit data referring to the detected electric charge loaded in respective cells/block of cells associated with a respective one of the integrated circuits 1a, 1b, 1c, 1d, or any other kind of data, from the respective integrated circuit 1a, 1b, 1c, 1d to a central microprocessor or microcontroller 100, e.g., a respective Battery Management Supervisor Controller, and/or to other ones of the above integrated circuits 1a, 1b, 1c, 1d, and/or vice versa (e.g., from the central microprocessor or microcontroller/Battery Management Supervisor Controller 100 to the above integrated circuits 1a, 1b, 1c, 1d). The above central microprocessor or microcontroller 100/Battery Management Supervisor Controller, e.g., may be connected with the first integrated circuit 1a in the above chain of integrated circuits 1a, 1b, 1c, 1d, e.g., a respective "Master Node" circuit 1a. The connection between the central microprocessor or microcontroller 100 and the "Master Node" circuit 1a, e.g., may be achieved via SPI (SPI=Serial Peripheral Interface), or any other suitable connection.

The above central microprocessor or microcontroller 100/Battery Management Supervisor Controller, in turn, may be connected to the main control device of the vehicle, e.g., via a respective CAN bus (CAN=Controller Area Network), or any other suitable connection.

Each of the above modules/components/elements 1a, 1b, 1c, 1d of the system 1, e.g., each of the above integrated circuits/ASICS 1a, 1b, 1c, 1d may comprise a first interface, e.g., a Lowside Interface (LS Interface) 11a, a second interface, e.g., a Highside Interface (HS Interface) 11b, and optionally, a Level shifter 13a, 13b, 13c, 13d connected between the LS Interface 11a, and the HS Interface 11b. Each Level shifter 13a, 13b, 13c, 13d may be connected with the respective additional logic circuits of a respective integrated circuit/ASIC 1a, 1b, 1c, 1d.

Hence, a respective data signal may, e.g., be transmitted from the integrated circuit/ASIC 1a, i.e., the "Master Node" circuit 1a (in particular, the respective Highside Interface (HS Interface) 11b thereof) via the bus 2a to the integrated circuit/ASIC 1b (in particular, the respective Lowside Interface (LS Interface) thereof). By the Level Shifter 13b of the integrated circuit/ASIC 1b the received data signal is shifted from the voltage domain of the ASIC 1a to the voltage domain of the ASIC 1b. Then, the voltage shifted received data signal may, e.g., be transmitted from the integrated circuit/ASIC 1b (in particular, the respective Highside Interface (HS Interface) thereof) via the bus 2b to the integrated circuit/ASIC 1c (in particular, the respective Lowside Interface (LS Interface) thereof).

Thereafter, by the Level Shifter 13c of the integrated circuit/ASIC 1c the received data signal is shifted from the voltage domain of the ASIC 1b to the voltage domain of the ASIC 1c. Then, the voltage shifted received data signal may, e.g., be transmitted from the integrated circuit/ASIC 1c (in particular, the respective Highside Interface (HS Interface) thereof) via the bus 2c to the integrated circuit/ASIC 1d (in particular, the respective Lowside Interface (LS Interface) thereof). By the Level Shifter 13d of the integrated circuit/ASIC 1d the received data signal is shifted from the voltage domain of the ASIC 1c to the voltage domain of the ASIC 1d, and is then transmitted from the integrated circuit/ASIC 1d (in particular, the respective Highside Interface (HS Interface) thereof) via the bus 2d to the next ASIC in the chain, etc., etc., until the data signal is received by the last ASIC 1e in the chain ("Final Node" circuit 1e).

Each integrated circuit/ASIC 1a, 1b, 1c, 1d, in particular, each of the above Level shifters may, e.g., shift the level of the data signals by a relatively high voltage amount, e.g., between 1V and 200 V, in particular, between 5V and 100 V, or 10V and 80V, e.g., up to 60V.

The busses 2a, 2b, 2c, 2d hence may be seen as commonly forming a bus system, where the separate busses 2a, 2b, 2c, 2d are galvanically decoupled from one another.

In addition, in some embodiments, the galvanic connection between respective HS and LS Interfaces of two different ones of the above integrated circuits/ASICs provided by a respective one of the above busses 2a, 2b, 2c, 2d (e.g., the galvanic connection between the HS Interface 11b of the integrated circuit/ASIC 1a and the LS Interface of the integrated circuit/ASIC 1b provided by the bus 2a, etc.) may be interrupted by a respective series connection of capacitors.

According to an embodiment of the invention, a method to transmit error data in the above system 1 comprising the above chain of modules/components/elements/integrated circuits 1a, 1b, 1c, 1d, 1e may take place in several, consecutive phases.

Figure 2:
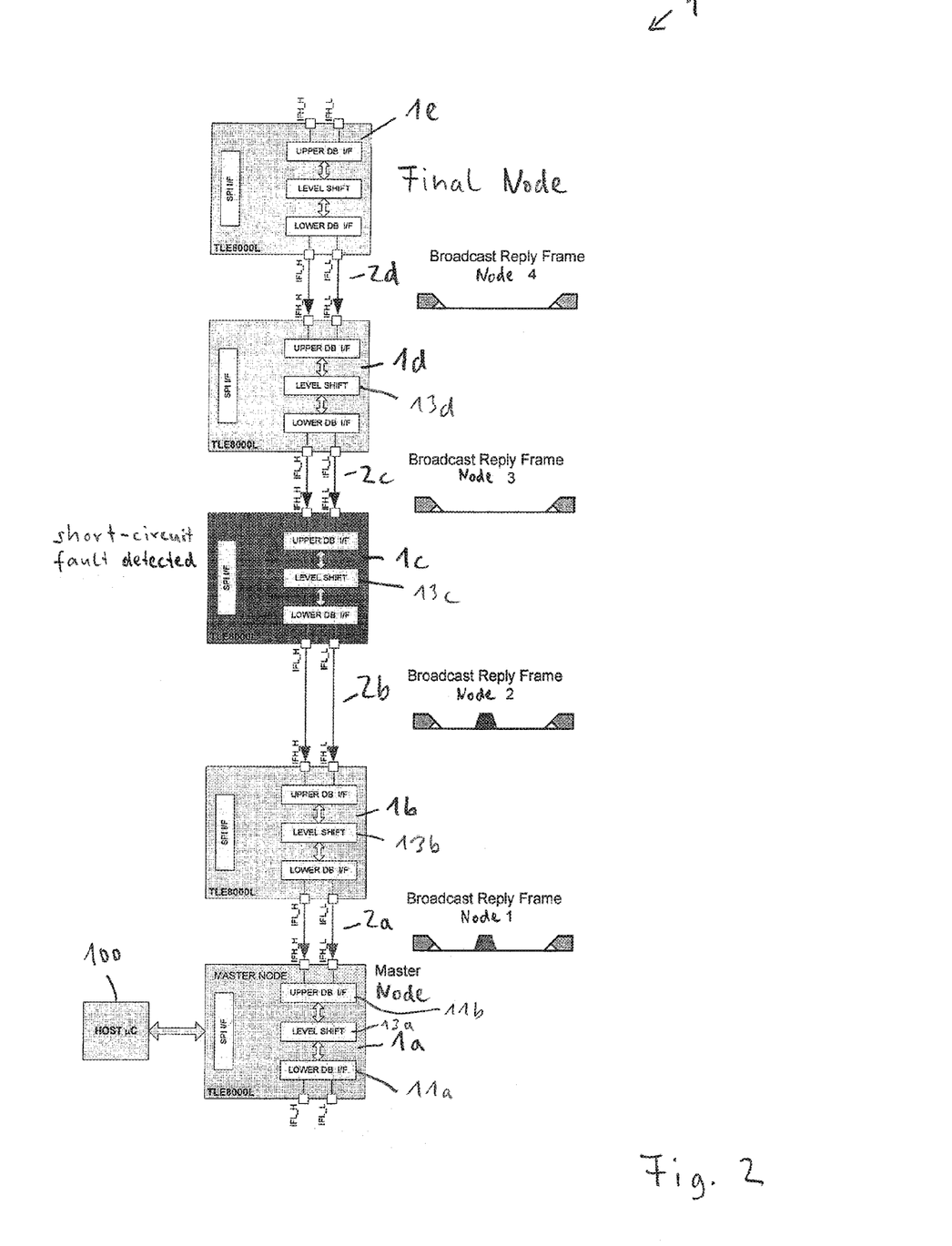
FIG. 2 schematically depicts an example of a series of data transmitted according to an embodiment of the invention, to obtain in a first phase of the method information what kinds of error have occurred in the system.
Figure 3:
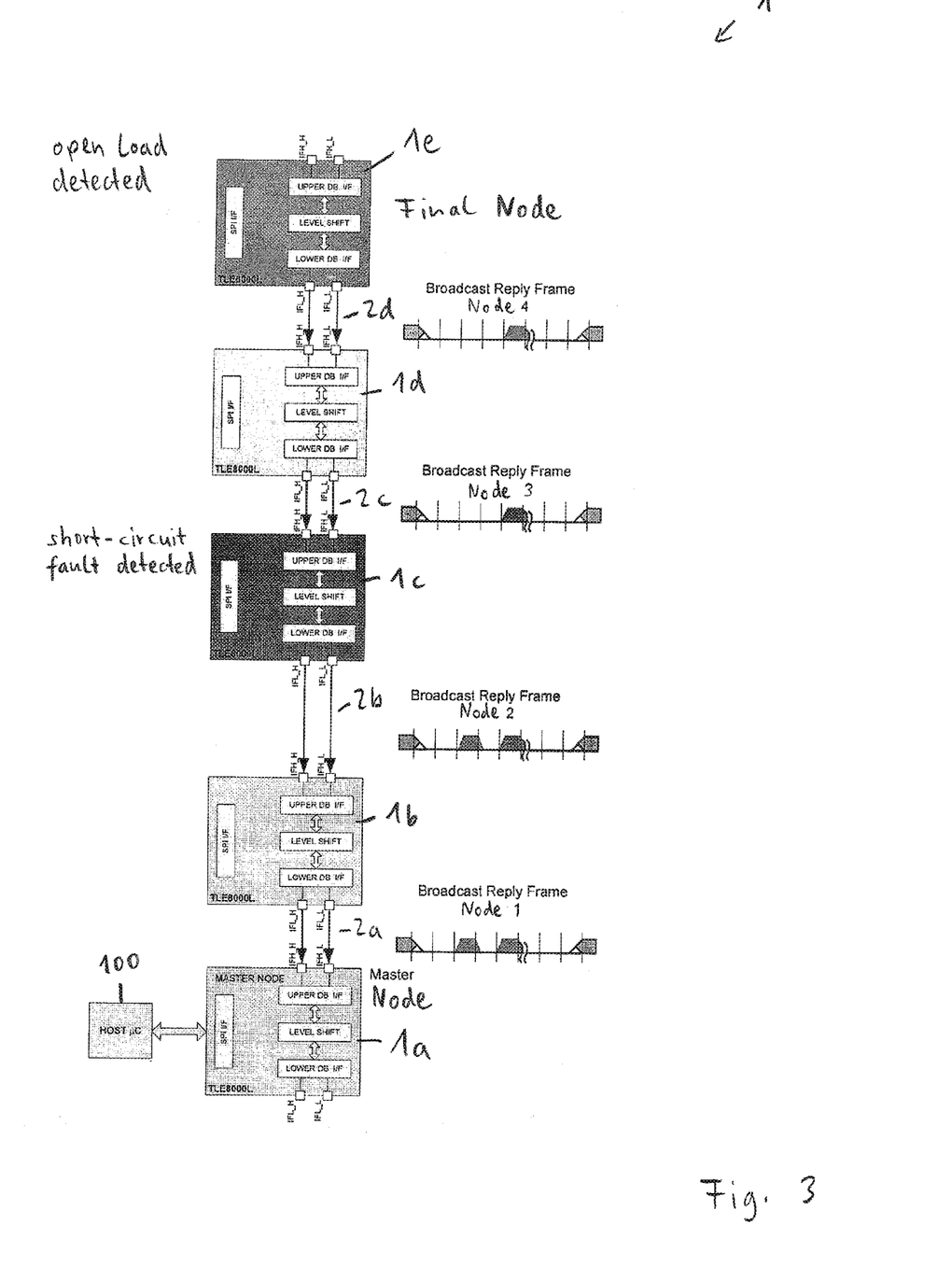
FIG. 3 schematically depicts an example of a series of data transmitted according to an embodiment of the invention, to obtain in a second phase of the method information where in the system an error has occurred.

As will be described in further detail below, in a first phase, as is schematically shown in FIG. 2, information may be obtained about what kind of error has occurred in the system 1. Thereafter, as will also be described in further detail below, in a second phase, as is schematically shown in FIG. 3, information may be obtained where, in particular, in which module/component/element/integrated circuit 1a, 1b, 1c, 1d, 1e in the system 1 shown in FIG. 1 an error has occurred, etc., etc.

The above method to transmit error data (in particular, e.g. the above first and/or second phase thereof) e.g., may be triggered by the central microprocessor or microcontroller 100/Battery Management Supervisor Controller, or, e.g., by the above first module/component/element/integrated circuit 1a in the above chain (e.g., the "Master Node" circuit 1a) (or, e.g., by any other of the above modules/components/elements/integrated circuits 1b, 1c, 1d, 1e), or, e.g., by the above main control device of the vehicle, or any other suitable device.

For example, in a first step of the first phase, a respective broadcast request may be sent out from the first module/component/element/integrated circuit 1a in the above chain (i.e., the "Master Node" circuit 1a) to the other modules/components/elements/integrated circuits 1b, 1c, 1d, 1e in the chain. The broadcast request, e.g., may be a data signal comprising a specific, predetermined sequence of bits, for instance, a specific, predetermined combination of logical "1"s and logical "0"s transmitted consecutively from the above "Master Node" circuit 1a over the above busses 2a, 2b, 2c, 2d from one circuit to the other to the above last circuit 1e in the above chain, i.e., the above "Final Node" circuit 1e.

Hence, the broadcast request data signal may, e.g., first be transmitted from the integrated circuit/ASIC 1a, i.e., the "Master Node" circuit 1a (in particular, the respective Highside Interface (HS Interface) 11b thereof) via the bus 2a to the integrated circuit/ASIC 1b (in particular, the respective Lowside Interface (LS Interface) 11a thereof). By the Level Shifter 13b of the integrated circuit/ASIC 1b the received broadcast request data signal is shifted from the voltage domain of the ASIC 1a to the voltage domain of the ASIC 1b. Then, the voltage shifted received broadcast request data signal may, e.g., be transmitted from the integrated circuit/ASIC 1b (in particular, the respective Highside Interface (HS Interface) thereof) via the bus 2b to the integrated circuit/ASIC 1c (in particular, the respective Lowside Interface (LS Interface) thereof).

Thereafter, by the Level Shifter 13c of the integrated circuit/ASIC 1c the received broadcast request data signal is shifted from the voltage domain of the ASIC 1b to the voltage domain of the ASIC 1c. Then, the voltage shifted received broadcast request data signal may, e.g., be transmitted from the integrated circuit/ASIC 1c (in particular, the respective Highside Interface (HS Interface) thereof) via the bus 2c to the integrated circuit/ASIC 1d (in particular, the respective Lowside Interface (LS Interface) thereof). By the Level Shifter 13d of the integrated circuit/ASIC 1d the received broadcast request data signal is shifted from the voltage domain of the ASIC 1c to the voltage domain of the ASIC 1d, and is then transmitted from the integrated circuit/ASIC 1d (in particular, the respective Highside Interface (HS Interface) thereof) via the bus 2d to the next ASIC in the chain, etc., etc., until the broadcast request data signal is received by the last ASIC 1e in the chain ("Final Node" circuit 1e).

In response to receiving the broadcast request data signal, the last ASIC 1e in the chain ("Final Node" circuit 1e) creates a respective response data frame. The response data frame may comprise a predetermined number of bits. Thereby, the predetermined number of bits may, e.g., correspond to the number of types of errors determined as relevant for the instant error transmittal method, in other words, may correspond to the number of predefined types of errors: For instance, if there are four predefined types of errors determined as relevant for the instant method such as, e.g., "open load," "short-circuit fault," "charge balancing," "temperature," the response data frame may, e.g., comprise four bits. If, alternatively, a smaller number of types of errors has been predefined, e.g., only three (or, e.g., only two) types of errors (e.g., "short-circuit fault", "charge balancing," and "temperature" (or, e.g., only "charge balancing" and "temperature")), the response data frame may comprise less, e.g., only three (or e.g., only two) bits. Alternatively, if a higher number of types of errors has been predefined, e.g., five (or e.g., six or more) types of errors, the response data frame may comprise more, e.g., five (or e.g., six or more) bits.

Each bit position in the above response data frame may be assigned to a specific one of the above predefined types of errors. For example, a first bit in the response data frame may be assigned to the error type "open load," a second bit in the response data frame may be assigned to the error type "short-circuit fault," a third bit in the response data frame may be assigned to the error type "charge balancing," a fourth bit in the response data frame may be assigned to the error type "temperature," etc.

If a respective error was detected/has occurred in the last ASIC 1e in the chain ("Final Node" circuit 1e), the ASIC 1e may set the respective bit in the response data frame to a predefined value, e.g., to a logical "1" (or, alternatively, to a logical "0") (and otherwise, may set the respective bit to the opposite of the above predefined value, e.g., to a logical "0" (or, alternatively, to a logical "1")). For instance, if the error type "open load" was detected/has occurred in the last ASIC 1e in the chain ("Final Node" circuit 1e), the ASIC 1e may set the first bit in the response data frame to a logical "1". However, if the error type "open load" was not detected/has not occurred in the last ASIC 1e in the chain ("Final Node" circuit 1e), the ASIC 1e may set the first bit in the response data frame to a logical "0". Correspondingly, if the error type "short-circuit fault" was detected/has occurred in the last ASIC 1e in the chain ("Final Node" circuit 1e), the ASIC 1e may set the second bit in the response data frame to a logical "1". However, if the error type "short-circuit fault" was not detected/has not occurred in the last ASIC 1e in the chain ("Final Node" circuit 1e), the ASIC 1e may set the second bit in the response data frame to a logical "0". Further, correspondingly, if the error type "charge balancing" was detected/has occurred in the last ASIC 1e in the chain ("Final Node" circuit 1e), the ASIC 1e may set the third bit in the response data frame to a logical "1". However, if the error type "charge balancing" was not detected/has not occurred in the last ASIC 1e in the chain ("Final Node" circuit 1e), the ASIC 1e may set the third bit in the response data frame to a logical "0". Finally, if the error type "temperature" was detected/has occurred in the last ASIC 1e in the chain ("Final Node" circuit 1e), the ASIC 1e may set the fourth bit in the response data frame to a logical "1". However, if the error type "temperature" was not detected/has not occurred in the last ASIC 1e in the chain ("Final Node" circuit 1e), the ASIC 1e may set the fourth bit in the response data frame to a logical "0".

The respective response data may then be transmitted from the ASIC 1e, i.e., the "Final Node" circuit 1e (in particular, the respective Lowside Interface (LS Interface) thereof) via the bus 2d to the preceding integrated circuit/ASIC 1d in the chain (in particular, the respective Highside Interface (HS Interface) thereof)).

If, e.g., none of the above errors was detected/has occurred in the last ASIC 1e in the chain, the response data sent to the preceding ASIC 1d in the chain, as shown in FIG. 2, comprises four logical "0"s, which are transmitted consecutively from the ASIC 1e via the bus 2d to the ASIC 1d.

In the ASIC 1d, the response data received from the ASIC 1e, in particular, the information received from the ASIC 1e regarding whether or not a respective error was detected/has occurred in the ASIC 1e is combined with information regarding whether or not the respective error was detected/has occurred in the ASIC 1d. Thereby, a respective "OR" operation may be applied:

For instance, if the error type "open load" was detected/has occurred in the ASIC 1d, OR if the first bit in the response data frame received from the ASIC 1e is a logical "1" (as the error type "open load" was detected/has occurred in the ASIC 1e), the ASIC 1d chooses the following (amended) value as a value for the first bit for the (amended) response data frame: logical "1". Otherwise, i.e., if the error type "open load" was not detected/has not occurred in the ASIC 1d, AND if the first bit in the response data frame received from the ASIC 1e is a logical "0" (as the error type "open load" was not detected/has not occurred in the ASIC 1e), the ASIC 1d chooses the following value as value for the first bit of the response data frame: logical Correspondingly, if the error type "short-circuit fault" was detected/has occurred in the ASIC 1d, OR if the second bit in the response data frame received from the ASIC 1e is a logical "1" (as the error type "short-circuit fault" was detected/has occurred in the ASIC 1e), the ASIC 1d chooses the following (amended) value as a value for the second bit of the (amended) response data frame: logical "1". Otherwise, i.e., if the error type "short-circuit fault" was not detected/has not occurred in the ASIC 1d, AND if the second bit in the response data frame received from the ASIC 1e is a logical "0" (as the error type "short-circuit fault" was not detected/has not occurred in the ASIC 1e), the ASIC 1d chooses the following value as a value for the second bit of the response data frame: logical "0".

Further, if the error type "charge balancing" was detected/has occurred in the ASIC 1d, OR if the third bit in the response data frame received from the ASIC 1e is a logical "1" (as the error type "charge balancing" was detected/has occurred in the ASIC 1e), the ASIC 1d chooses the following (amended) value as value for the third bit of the (amended) response data frame: logical "1". Otherwise, i.e., if the error type "charge balancing" was not detected/has not occurred in the ASIC 1d, AND if the third bit in the response data frame received from the ASIC 1e is a logical "0" (as the error type "charge balancing" was not detected/has not occurred in the ASIC 1e), the ASIC 1d chooses the following value as value for the third bit of the response data frame; logical "0".

Finally, if the error type "temperature" was detected/has occurred in the ASIC 1d, OR if the fourth bit in the response data frame received from the ASIC 1e is a logical "1" (as the error type "temperature" was detected/has occurred in the ASIC 1e), the ASIC 1d chooses the following (amended) value as a value for the fourth bit of the (amended) response data frame: logical "1". Otherwise, i.e., if the error type "temperature" was not detected/has not occurred in the ASIC 1d, AND if the fourth bit in the response data frame received from the ASIC 1e is a logical "0" (as the error type "temperature" was not detected/has not occurred in the ASIC 1e), the ASIC 1d chooses the following value as value for the fourth bit of the response data frame: logical "0".

The respective (level-shifted, and in the above explained cases amended) response data may then be transmitted from the ASIC 1d (in particular, the respective Lowside Interface (LS Interface) thereof) via the bus 2c to the next preceding integrated circuit/ASIC 1c in the chain (in particular, the respective Highside Interface (HS Interface) thereof)).

If, e.g., none of the above errors was detected/has occurred in the last ASIC 1e in the chain, and in the preceding ASIC 1d, the response data sent to the next preceding ASIC 1c in the chain, as shown in FIG. 2, again comprises four logical "0"s, which are transmitted consecutively from the ASIC 1d via the bus 2c to the ASIC 1c.

In the ASIC 1c, correspondingly similar as explained above, the (amended) response data received from the ASIC 1d, in particular, the information received from the ASIC 1d regarding whether or not a respective error was detected/has occurred in either the ASIC 1e or the ASIC 1d is combined with information regarding whether or not the respective error was detected/has occurred in the ASIC 1c. Thereby, again, a respective "OR" operation may be applied:

For instance, if the error type "open load" was detected/has occurred in the ASIC 1c, OR if the first bit in the response data frame received from the ASIC 1d is a logical "1", the ASIC 1c chooses the following (amended) value as value for the first bit for the (amended) response data frame: logical "1". Otherwise, i.e., if the error type "open load" was not detected/has not occurred in the ASIC 1c, AND if the first bit in the response data frame received from the ASIC 1d is a logical "0", the ASIC 1c chooses the following value as value for the first bit of the response data frame: logical "0".

Correspondingly, if the error type "short-circuit fault" was detected/has occurred in the ASIC 1c, OR if the second bit in the response data frame received from the ASIC 1d is a logical "1", the ASIC 1d chooses the following (amended) value as value for the second bit of the (amended) response data frame: logical "1". Otherwise, i.e., if the error type "short-circuit fault" was not detected/has not occurred in the ASIC 1c, AND if the second bit in the response data frame received from the ASIC 1d is a logical "0", the ASIC 1c chooses the following value as value for the second bit of the response data frame: logical "0".

Further, if the error type "charge balancing" was detected/has occurred in the ASIC 1c, OR if the third bit in the response data frame received from the ASIC 1d is a logical "1", the ASIC 1c chooses the following (amended) value as value for the third bit of the (amended) response data frame: logical "1". Otherwise, i.e., if the error type "charge balancing" was not detected/has not occurred in the ASIC 1c, AND if the third bit in the response data frame received from the ASIC 1d is a logical "0", the ASIC 1c chooses the following value as value for the third bit of the response data frame: logical "0".

Finally, if the error type "temperature" was detected/has occurred in the ASIC 1c, OR if the fourth bit in the response data frame received from the ASIC 1d is a logical "1", the ASIC 1c chooses the following (amended) value as value for the fourth bit of the (amended) response data frame: logical "1". Otherwise, i.e., if the error type "temperature" was not detected/has not occurred in the ASIC 1c, AND if the fourth bit in the response data frame received from the ASIC 1d is a logical "0", the ASIC 1c chooses the following value as value for the fourth bit of the response data frame: logical "0".

The respective (level-shifted, and in the above explained cases amended) response data may then be transmitted from the ASIC 1c (in particular, the respective Lowside Interface (LS Interface) thereof) via the bus 2b to the next preceding integrated circuit/ASIC 1b in the chain (in particular, the respective Highside Interface (HS Interface) thereof)).

If, e.g., the error type "short-circuit fault" was detected/has occurred in the ASIC 1c, but no other types of errors were detected/have occurred in the ASIC 1c or any of the ASICs 1d, 1e, the (amended) response data sent to the next preceding ASIC 1b in the chain, as shown in FIG. 2, consecutively comprises a logical "0", a logical "1" (to indicate the detected "short-circuit fault"), and two additional logical "0"s, which are transmitted from the ASIC 1c via the bus 2b to the ASIC 1b.

In the ASIC 1b, correspondingly similar as explained above, the (amended) response data received from the ASIC 1c, in particular, the information received from the ASIC 1c regarding whether or not a respective error was detected/has occurred in either the ASIC 1e or the ASIC 1d or the ASIC 1c is combined with information regarding whether or not the respective error was detected/has occurred in the ASIC 1b. Thereby, again, the above-explained "OR" operation may be applied.

The respective (level-shifted, and in the above explained cases amended) response data may then be transmitted from the ASIC 1b (in particular, the respective Lowside Interface (LS Interface) thereof) via a respective bus to the next preceding integrated circuit/ASIC in the chain, and so forth, and so forth, till finally the response data is received in the first ASIC 1a of the chain, i.e., the above "Master Node" circuit 1a (in particular, the respective Highside Interface (HS Interface) thereof)).

The response data received by the first ASIC 1a of the chain (i.e., the above "Master Node" circuit 1a) hence comprises information regarding what kinds of errors have occurred in the system 1. This information may, e.g., be accessed by the central microprocessor or microcontroller 100/Battery Management Supervisor Controller (e.g., via SPI (SPI=Serial Peripheral Interface), or any other suitable connection), or, e.g., by the above main control device of the vehicle, or any other suitable device, if appropriate.

Thereafter, as already mentioned above, in a second phase, as is schematically shown in FIG. 3, information may be obtained where, in particular, in which module/component/element/integrated circuit 1a, 1b, 1c, 1d, 1e in the system 1 shown in FIG. 1 an error has occurred.

For this purpose, a respective "Faulty Node Query" broadcast request may be sent out from the first module/component/element/integrated circuit 1a in the above chain (i.e., the "Master Node" circuit 1a) to the other modules/components/elements/integrated circuits 1b, 1c, 1d, 1e in the chain. The "Faulty Node Query" broadcast request, e.g., may be a data signal comprising a specific, predetermined sequence of bits (which are, e.g., different from the bits used in the broadcast request of the above first phase), for instance, a specific, predetermined combination of logical "1"s and logical "0"s transmitted consecutively from the above "Master Node" circuit 1a over the above busses 2a, 2b, 2c, 2d from one circuit to the other to the above last circuit 1e in the above chain, i.e., the above "Final Node" circuit 1e.

In response to receiving the "Faulty Node Query" broadcast request data signal, the last circuit 1e in the chain ("Final Node" circuit 1e) creates a respective response data frame. The "Faulty Node Query" response data frame, e.g., may comprise a predetermined number of bits, or, preferably, may comprise a variable number of bits, e.g., depending on the number of circuits 1a, 1b, 1c, 1d, 1e in the above chain (wherein the number of circuits 1a, 1b, 1c, 1d, 1e in the chain is known by the "Final Node" circuit 1e). For instance, the number of bits in the "Faulty Node Query" response data frame may be identical with (or bigger than) this (known) number of circuits 1a, 1b, 1c, 1d, 1e in the chain.

Each bit position in the above "Faulty Node Query" response data frame may be assigned to/associated with a specific one of the above circuits in the chain. For example, as shown in FIG. 3, a first bit in the "Faulty Node Query" response data frame may be assigned to/associated with the circuit 1b, a second bit in the "Faulty Node Query" response data frame may be assigned to/associated with the circuit 1c, a third bit in the "Faulty Node Query" response data frame may be assigned to/associated with the circuit 1d, a fourth bit in the "Faulty Node Query" response data frame may be assigned to/associated with the circuit 1e, etc.

If any of the above-described errors was detected/has occurred in the last circuit/ASIC 1e in the chain ("Final Node" circuit 1e), the ASIC 1e may set its respective associated bit in the "Faulty Node Query" response data frame (e.g., the fourth bit) to a predefined value, e.g., to a logical "1" (or, alternatively, to a logical "0"), and may set the respective non-associated bits (e.g., the first, second, third bit, etc.) to the opposite of the above predefined value, e.g., to a logical "0" (or, alternatively, to a logical "1").

For instance, as is shown in FIG. 3, if the error type "open load" or any other of the above-described errors was detected/has occurred in the last ASIC 1e in the chain ("Final Node" circuit 1e), the ASIC 1e may set its associated fourth bit in the "Faulty Node Query" response data frame to a logical "1", and may set the respective non-associated bits (e.g., the first, second, third bit, etc.) to the opposite of the above predefined value, e.g., to a logical "0". However, if none of the above-described errors was detected/has occurred in the last ASIC 1e in the chain ("Final Node" circuit 1e), the ASIC 1e may set its associated fourth bit as well as the non-associated bits in the response data frame (e.g., the first, second, third bit, etc.) to a logical The respective "Faulty Node Query" response data may then be transmitted from the ASIC 1e, i.e., the "Final Node" circuit 1e (in particular, the respective Lowside Interface (LS Interface) thereof) via the bus 2d to the preceding integrated circuit/ASIC 1d in the chain (in particular, the respective Highside Interface (HS Interface) thereof)).

In the ASIC 1d, the "Faulty Node Query" response data received from the ASIC 1e is combined with respective information from the ASIC 1d.

If any of the above-described errors was detected/has occurred in the ASIC 1d, the ASIC 1d may set its respective associated bit in the "Faulty Node Query" response data frame (e.g., the third bit) to a predefined value, e.g., to a logical "1" (or, alternatively, to a logical "0"), and otherwise, i.e., if none of the above-described errors was detected/has occurred in the ASIC 1d, may set its respective associated bit (e.g., the third bit) to the opposite of the above predefined value, e.g., to a logical "0" (or, alternatively, to a logical "1"). With regards to the further, non-associated bits (e.g., the first, second, fourth bit, etc.), the "Faulty Node Query" response data values received from the ASIC 1e are maintained.

For instance, as is shown in FIG. 3, if none of the above-described errors was detected/has occurred in the ASIC 1d, the ASIC 1d may set its associated third bit in the "Faulty Node Query" response data frame to a logical "0". Further, according to the "Faulty Node Query" response data received from the ASIC 1e, the ASIC 1d may set the respective non-associated fourth bit, etc., to a logical "1", and may set the respective non-associated first and second bits, etc., to a logical "0".

The respective (level-shifted, and in the above explained cases amended) "Faulty Node Query" response data may then be transmitted from the ASIC 1d (in particular, the respective Lowside Interface (LS Interface) thereof) via the bus 2c to the next preceding integrated circuit/ASIC 1c in the chain (in particular, the respective Highside Interface (HS Interface) thereof)).

In the ASIC 1c, correspondingly similar as explained above, the (amended) "Faulty Node Query" response data received from the ASIC 1d is combined with respective information from the ASIC 1c.

If any of the above-described errors was detected/has occurred in the ASIC 1c, the ASIC 1c may set its respective associated bit in the "Faulty Node Query" response data frame (e.g., the second bit) to a predefined value, e.g., to a logical "1" (or, alternatively, to a logical "0"), and otherwise, i.e., if none of the above-described errors was detected/has occurred in the ASIC 1c, may set its respective associated bit (e.g., the second bit) to the opposite of the above predefined value, e.g., to a logical "0" (or, alternatively, to a logical "1"). With regards to the further, non-associated bits (e.g., the first, third, fourth bit, etc.), the "Faulty Node Query" response data values received from the ASIC 1d are maintained.

For instance, as is shown in FIG. 3, if a "short-circuit fault" error was detected/has occurred in the ASIC 1c, the ASIC 1c may set its associated second bit in the "Faulty Node Query" response data frame to a logical "1". Further, according to the "Faulty Node Query" response data received from the ASIC 1d, the ASIC 1c may set the respective non-associated fourth bit, etc. to a logical "1", and may set the respective non-associated first and third bit, etc. to a logical "0".

The respective (level-shifted, and in the above explained cases amended) "Faulty Node Query" response data may then be transmitted from the ASIC 1c (in particular, the respective Lowside Interface (LS Interface) thereof) via the bus 2b to the next preceding integrated circuit/ASIC 1b in the chain (in particular, the respective Highside Interface (HS Interface) thereof)).

In the ASIC 1b, the "Faulty Node Query" response data received from the ASIC 1c is combined with respective information from the ASIC 1b.

If any of the above-described errors was detected/has occurred in the ASIC 1b, the ASIC 1b may set its respective associated bit in the "Faulty Node Query" response data frame (e.g., the first bit) to a predefined value, e.g., to a logical "1" (or, alternatively, to a logical "0"), and otherwise, i.e., if none of the above-described errors was detected/has occurred in the ASIC 1b, may set its respective associated bit (e.g., the first bit) to the opposite of the above predefined value, e.g., to a logical "0" (or, alternatively, to a logical "1"). With regards the further, non-associated bits (e.g., the second, third, fourth bit, etc.), the "Faulty Node Query" response data values received from the ASIC 1c are maintained.

For instance, as is shown in FIG. 3, if none of the above-described errors was detected/has occurred in the ASIC 1b, the ASIC 1b may set its associated first bit in the "Faulty Node Query" response data frame to a logical "0". Further, according to the "Faulty Node Query" response data received from the ASIC 1c, the ASIC 1b may set the respective non-associated second and fourth bits, etc., to a logical "1", and may set the respective non-associated third bit, etc., to a logical "0".

The respective (level-shifted, and in the above explained cases amended) "Faulty Node Query" response data may then be transmitted from the ASIC 1b (in particular, the respective Lowside Interface (LS Interface) thereof) via the bus 2a to the next preceding integrated circuit/ASIC in the chain, and so forth, and so forth, until finally the "Faulty Node Query" response data is received in the first ASIC 1a of the chain, i.e., the above "Master Node" circuit 1a (in particular, the respective Highside Interface (HS Interface) thereof)).

The "Faulty Node Query" response data received by the first ASIC 1a of the chain (i.e., the above "Master Node" circuit 1a) in the above second phase hence comprises information where, in particular, in which module/component/element/integrated circuit 1a, 1b, 1c, 1d, 1e in the system 1 shown in FIG. 1 an error has occurred.

This information obtained in the above second phase may (correspondingly similar as the information obtained in the above first phase) e.g., be accessed by the central microprocessor or microcontroller 100/Battery Management Supervisor Controller (e.g., via SPI (SPI=Serial Peripheral Interface), or any other suitable connection), or, e.g., by the above main control device of the vehicle, or any other suitable device, if appropriate.

Figure 4:
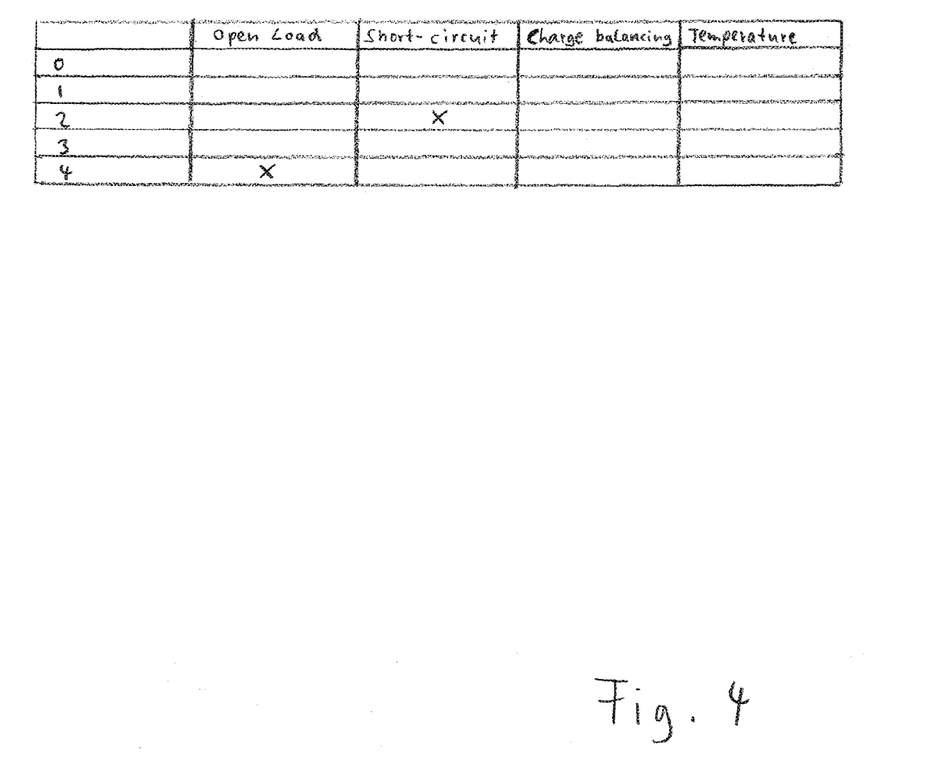
FIG. 4 shows a matrix depicting the combination of information obtained in the first and second phases.

The information obtained in the above first phase, i.e., the information regarding what kinds of errors have occurred in the system 1, and the information obtained in the above second phase, i.e., the information where, in particular, in which module/component/element/integrated circuit 1a, 1b, 1c, 1d, 1e in the system 1 shown in FIG. 1 an error has occurred may be combined, e.g., as is shown in FIG. 4, in the form of a matrix.

Thereafter, optionally, in a third phase, additional information may be obtained with regards to the detected errors from the respective modules/components/elements/integrated circuits 1a, 1b, 1c, 1d, 1e for which an error was detected.

For this purpose, respective error diagnosis registers of those modules/components/elements/integrated circuits 1a, 1b, 1c, 1d, 1e for which an error was detected may be read out.

For instance, if in the above first and second phases a "temperature" error was detected to have occurred in, e.g., the module/component/element/integrated circuit 1d, an error diagnosis register of this module/component/element/integrated circuit 1d, in particular, a respective temperature error diagnosis register may be read out on which, e.g., the actually measured temperature was stored, or, e.g., the history of the respectively measured temperatures, etc.

Hence, getting back to the specific examples shown in FIGS. 2 - 4, in the above third phase, additional information may, e.g., be obtained regarding the "short-circuit fault" detected in ASIC 1c, and/or, e.g., the "open load" detected in ASIC 1e by reading out respective (short-circuit fault/open load) error diagnosis registers of these ASICS 1c, 1e.

For this purpose, e.g., triggered by the central microprocessor/microcontroller 100, or, e.g., by the above first module/component/element/integrated circuit 1a in the above chain (e.g., the "Master Node" circuit 1a), respective diagnosis register read out requests may be sent out from the first module/component/element/integrated circuit 1a in the above chain (i.e., the "Master Node" circuit 1a) to the respective ASICS via the above busses 2a, 2b, 2c, 2d, and the data read out from the respective diagnosis registers in response to these requests may be sent via these buses to the "Master Node" circuit 1a for further, detailed error analysis (to be performed, e.g., by the central microprocessor or microcontroller 100/Battery Management Supervisor Controller).

Alternatively, before sending out such a diagnosis register read out requests, and before performing the above detailed error analysis, the charge balancing for all modules/components/elements/integrated circuits in the above chain may be interrupted. For this purpose, e.g. triggered by the central microprocessor/microcontroller 100, or, e.g., by the above first module/component/element/integrated circuit 1a in the above chain (e.g., the "Master Node" circuit 1a), a respective load balancing interruption request may be sent out from the first module/component/element/integrated circuit 1a (i.e., the "Master Node" circuit 1a) to the other modules/components/elements/integrated circuits in the chain. In this case, only after interrupting the load balancing, the above detailed error analysis is performed (e.g., by sending out the above diagnosis register read out requests).

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method to transmit error data over a bus system that connects a plurality of components of an electronic system in a chain-like structure, the method comprising:
    transmitting a first information signal over a data bus during a first period, the first information signal indicating an error type associated with an error that occurred in the electronic system, wherein the data bus is a single channel interconnecting the plurality of components; and
    transmitting a second information signal over the data bus during a second period, the second information signal indicating a location where the error occurred in the electronic system, wherein the second information signal excludes the error type, and wherein the first information signal excludes the location where the error occurred.

2. The method of claim 1, further comprising:
    receiving, over the data bus, a request to transmit information regarding what kinds of errors have occurred in the electronic system from one of the components.

3. The method of claim 1, wherein the first period occurs before the second period.

4. The method of claim 1, wherein the second period occurs before the first period.

5. The method of claim 1, wherein, in response to receiving a request for information regarding what kinds of errors have occurred in the electronic system, a last component on the data bus generates response data, and sends the response data to a preceding component on the data bus.

6. The method of claim 5, wherein, in response to receiving the response data from the last component, the preceding component generates amended response data by combining the response data received from the last component with response data generated internally in the preceding component, and sends the amended response data to a further preceding component on the data bus.

7. The method of claim 1, wherein, in response to receiving a request for information regarding where in the electronic system the error has occurred, a last component on the data bus generates response data, and sends the response data to a preceding component on the data bus.

8. The method of claim 7, wherein, in response to receiving the response data from the last component, the preceding component generates amended response data by combining the response data received from the last component with response data generated internally in the preceding component, and sends the amended response data to a further preceding component on the data bus.

9. The method of claim 1, wherein the first information signal comprises a number of bits, and wherein each of the bits is associated with a different error type.

10. The method of claim 1, wherein the second information signal comprises a number of bits, and wherein each of the bits is associated with a different component on the data bus.

11. A device to be coupled in a bus system that connects a plurality of components of an electronic system in a chain-like structure, the device comprising:
    an input configured to be coupled to a preceding component of a data bus;
    an output configured to be coupled to a next component of the data bus; and
    a first component configured to receive, during a first period, a first information signal over the data bus indicating an error type associated with an error that occurred in the electronic system and to receive, during a second period, a second information signal over the data bus indicating a location where the error occurred in the electronic system, wherein the data bus is a single channel interconnecting the first component to the preceding or next component, wherein the second information signal excludes the error type, and wherein the first information signal excludes the location where the error occurred.

12. The device of claim 11, wherein the data bus comprises a plurality of connections, and wherein each connection comprises two transmission lines extending between two consecutive components on the data bus.

13. The device of claim 12, wherein the data bus comprises an Inter Block Communication Bus (IBCB).

14. The device of claim 11, wherein the data bus comprises a plurality of connections, and wherein each connection is a single transmission line extending between two consecutive components on the data bus.

15. The device of claim 11, wherein the plurality of components of the electronic system include modules, elements, or both, wherein the data bus comprises the chain-like structure, and wherein the data bus is one of a plurality of buses in the data bus system.

16. The method of claim 1, wherein the plurality of components of the electronic system include modules, elements, or both, wherein the data bus comprises the chain-like structure, and wherein the data bus is one of a plurality of buses in the data bus system.

17. A vehicle comprising:
    a plurality of components including a least a master component; and
    a data bus interconnecting the plurality of components, the data bus and the plurality of components forming at least a portion of an electronic system, wherein the data bus is a single channel communicatively coupling the plurality of components with one another, and wherein the master component is configured to receive a first information signal over the data bus during a first period, the first information signal indicating an error type associated with an error that occurred in the electronic system, and to receive a second information signal over the data bus during a second period, the second information signal indicating a location where the error occurred in the electronic system, wherein the second information signal excludes the error type, and wherein the first information signal excludes the location where the error occurred.

18. The vehicle of claim 17, further comprising:
a battery comprising a plurality of cells, wherein the plurality of components are configured to monitor the plurality of cells.

19. The vehicle of claim 17, wherein the first information signal comprises a number of bits, and wherein each of the bits is associated with a different error type.

20. The vehicle of claim 17, wherein the second information signal comprises a number of bits, and wherein each of the bits is associated with a different component on the data bus.

21. A system comprising:
a data bus, wherein the data bus is a single channel communicatively coupling a plurality of components with one another;
a means for transmitting a first information signal over the data bus during a first period, the first information signal indicating an error type associated with an error that occurred in an electronic system; and
a means for transmitting a second information signal over the data bus during a second period, the second information signal indicating a location where the error occurred in the electronic system, wherein the second information signal excludes the error type, and wherein the first information signal excludes the location where the error occurred.

* * * * *